United States Patent
Tseng et al.

(10) Patent No.: US 9,804,983 B2
(45) Date of Patent: Oct. 31, 2017

(54) CONTROLLING METHOD, CONNECTOR, AND MEMORY STORAGE DEVICE

(71) Applicant: PHISON ELECTRONICS CORP., Miaoli (TW)

(72) Inventors: Ming-Hui Tseng, Hsinchu (TW); Kian-Fui Seng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 363 days.

(21) Appl. No.: 13/831,710

(22) Filed: Mar. 15, 2013

(65) Prior Publication Data

US 2014/0223076 A1 Aug. 7, 2014

(30) Foreign Application Priority Data

Feb. 6, 2013 (TW) .............................. 102104645 A

(51) Int. Cl.
*G06F 12/02* (2006.01)
*G06F 13/38* (2006.01)

(52) U.S. Cl.
CPC .................................. *G06F 13/385* (2013.01)

(58) Field of Classification Search
CPC ....... G06F 13/385; G06F 3/0659; G06F 3/061
See application file for complete search history.

(56) References Cited

U.S. PATENT DOCUMENTS

| 5,640,596 | A   | * | 6/1997 | Takamoto ............. | G06F 13/126 |
|-----------|-----|---|--------|-----------------------|-------------|
|           |     |   |        |                       | 710/21      |
| 8,930,583 | B1  | * | 1/2015 | Shapira ................ | G06F 13/385 |
|           |     |   |        |                       | 710/36      |
| 2007/0038802 | A1 | * | 2/2007 | Tsai et al. ..................... | 711/103 |
| 2007/0088860 | A1 | * | 4/2007 | Chang ................... | G06F 3/0611 |
|           |     |   |        |                       | 710/15      |
| 2008/0005490 | A1 | * | 1/2008 | Shiraki ................ | G06F 3/0611 |
|           |     |   |        |                       | 711/147     |

\* cited by examiner

*Primary Examiner* — Ann J Lo
*Assistant Examiner* — Jane Wei
(74) *Attorney, Agent, or Firm* — JCIPRNET

(57) ABSTRACT

A controlling method, a connector, and a memory storage device are provided. The controlling method includes following steps. A connection between the memory storage device and a host system is established. A first command is received from the host system and stored into a command queue. The command queue includes at least one second command after the first command is stored into the command queue. Whether a command number of the second commands is greater than a threshold is determined. The threshold is greater than 1. If the command number is greater than the threshold, a using right of the connection is obtained and a second command is executed by the memory storage device. If the command number is not greater than the threshold, a command from the host system is waited for. The using right of the connection belongs to the host system. Thereby, the system efficiency is improved.

18 Claims, 5 Drawing Sheets

CONTROLLING METHOD, CONNECTOR, AND MEMORY STORAGE DEVICE

CROSS-REFERENCE TO RELATED APPLICATION

This application claims the priority benefit of Taiwan application serial no. 102104645, filed on Feb. 6, 2013. The entirety of the above-mentioned patent application is hereby incorporated by reference herein and made a part of this specification.

BACKGROUND

1. Technology Field

The present invention generally relates to a controlling method, and more particularly, to a controlling method of a memory storage device, and a connector and a memory storage device using the same.

2. Description of Related Art

Along with the widespread of digital cameras, cell phones, and MP3 players in recently years, the consumers' demand to storage media has increased drastically. Rewritable non-volatile memory (for example, flash memory) is one of the most adaptable storage media to aforementioned portable multimedia devices due to its many characteristics such as data non-volatility, low power consumption, small volume, and non-mechanical structure.

A rewritable non-volatile memory module is usually packaged into a memory storage device and coupled to a host system via a transmission interface. The host system can issue one or more commands to access data in the memory storage device. To be specific, these commands are stored in a command queue of the memory storage device, and the memory storage device determines the execution sequence of these commands. Thereby, how to improve the execution efficiency of the entire system by using the command queue is a subject to be resolved in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, exemplary embodiments of present invention are directed to a controlling method and a connector and a memory storage device using the same, in which the execution efficiency of an entire system is improved.

An exemplary embodiment of the present invention provides a controlling method for a memory storage device. The controlling method includes following steps. A connection between a host system and the memory storage device is established. A first command is received from the host system and stored into a command queue, where the command queue includes at least one second command after the first command is stored into the command queue. Whether a command number of the at least one second command is greater than a threshold is determined, where the threshold is greater than 1. If the command number is greater than the threshold, a using right of the connection is obtained and one of the at least one second commands is executed by the memory storage device. If the command number is not greater than the threshold, a command from the host system is waited for, where the using right of the connection belongs to the host system.

An exemplary embodiment of the present invention provides a connector including a memory, a transmission circuit, and a control circuit. The memory stores a command queue. The transmission circuit is coupled to the memory. The transmission circuit establishes a connection between a host system and the connector, receives a first command from the host system, and stores the first command into the command queue. The command queue stores at least one second command after the first command is stored into the command queue. The control circuit is coupled to the memory and the transmission circuit. The control circuit determines whether a command number of the at least one second command is greater than a threshold, where the threshold is greater than 1. If the command number is greater than the threshold, the transmission circuit obtains a using right of the connection, and the control circuit executes one of the at least one second command. If the command number is not greater than the threshold, the transmission circuit waits to receive a command from the host system, where the using right of the connection belongs to the host system.

An exemplary embodiment of the present invention provides a memory storage device including a connector, a rewritable non-volatile memory module, and a memory controller. The rewritable non-volatile memory module includes a plurality of physical erasing units. The connector is configured to couple to a host system. The memory controller is coupled to the connector and the rewritable non-volatile memory module. The connector includes a memory, a transmission circuit, and a control circuit. The memory stores a command queue. The transmission circuit is coupled to the memory. The transmission circuit establishes a connection between the host system and the connector, receives a first command from the host system, and stores the first command into the command queue. The command queue stores at least one second command after the first command is stored into the command queue. The control circuit is coupled to the memory and the transmission circuit. The control circuit determines whether a command number of the at least one second command is greater than a threshold, where the threshold is greater than 1. If the command number is greater than the threshold, the transmission circuit obtains a using right of the connection, and the control circuit executes one of the at least one second command. If the command number is not greater than the threshold, the transmission circuit waits to receive a command from the host system, where the using right of the connection belongs to the host system.

As described above, exemplary embodiments of the present invention provide a controlling method, a connector, and a memory storage device, in which a host system is allowed to transmit commands to the memory storage device in an appropriate manner such that the execution efficiency of the entire system is improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
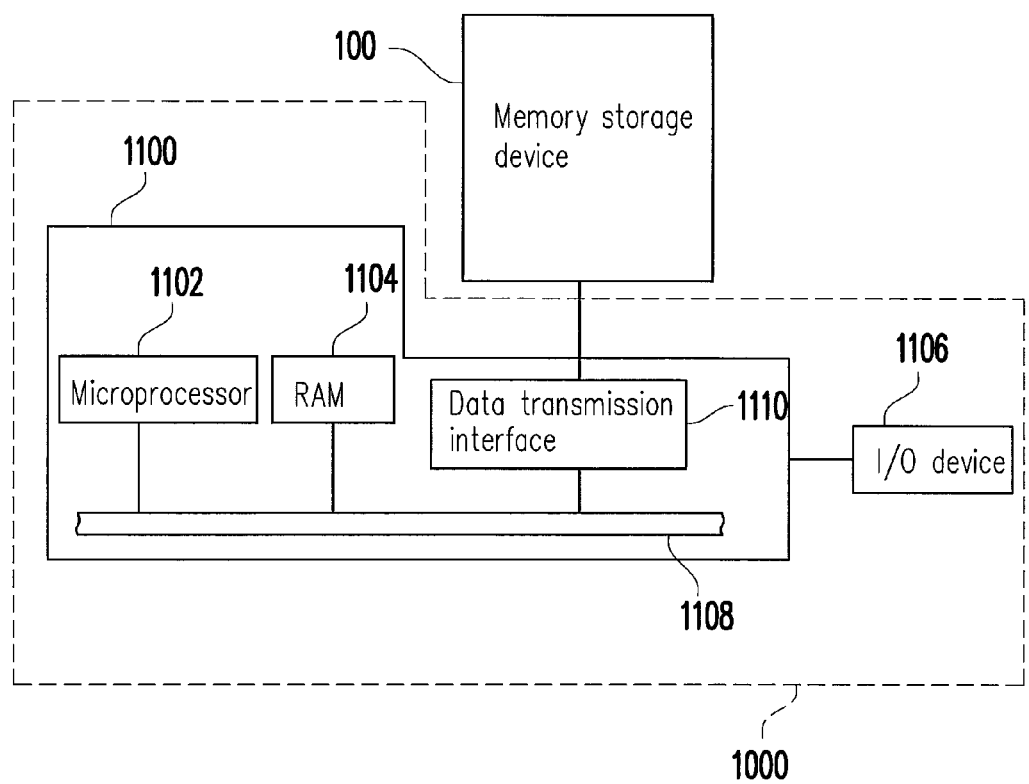
FIG. 1A illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a rewritable non-volatile memory module and a controller (also referred to as a control circuit). A memory storage device is usually used with a host system so that the host system can write data into or read data from the memory storage device.

FIG. 1A illustrates a host system and a memory storage device according to an exemplary embodiment.

Figure 1B:
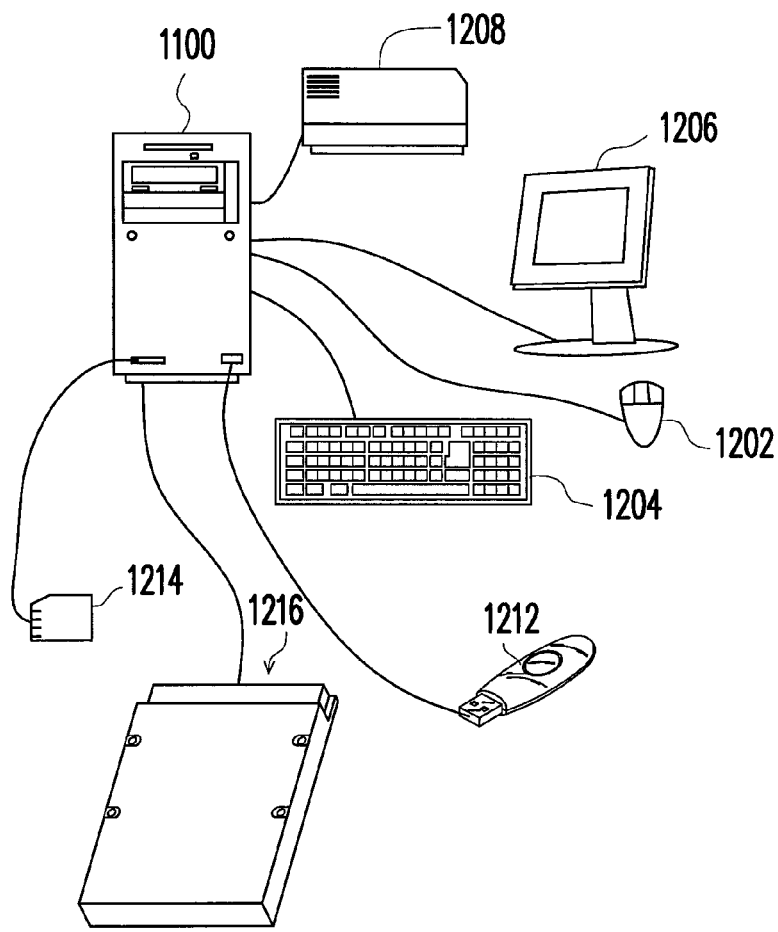
FIG. 1B is a diagram of a computer, an input/output (I/O) device, and a memory storage device according to an exemplary embodiment.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a memory storage device 100 is coupled to other components of the host system 1000 via the data transmission interface 1110. Data can be written into or read from the memory storage device 100 through the operations of the microprocessor 1102, the RAM 1104, and the I/O device 1106. The memory storage device 100 is a rewritable non-volatile memory storage device, such as the flash drive 1212, the memory card 1214, or the solid state drive (SSD) 1216 illustrated in FIG. 1B.

Figure 1C:
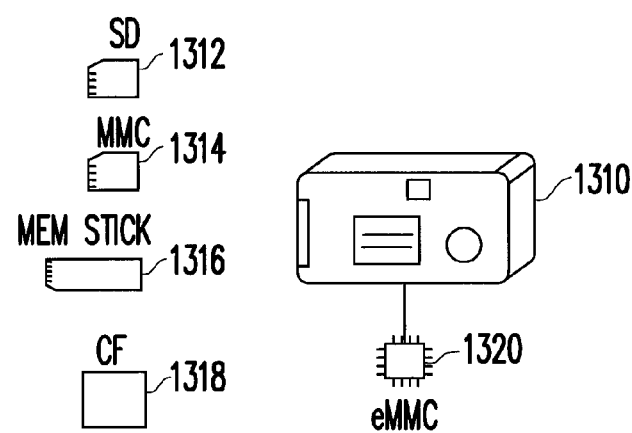
FIG. 1C is a diagram of a host system and a memory storage device according to an exemplary embodiment.

Generally speaking, the host system 1000 can be substantially any system that works with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2:
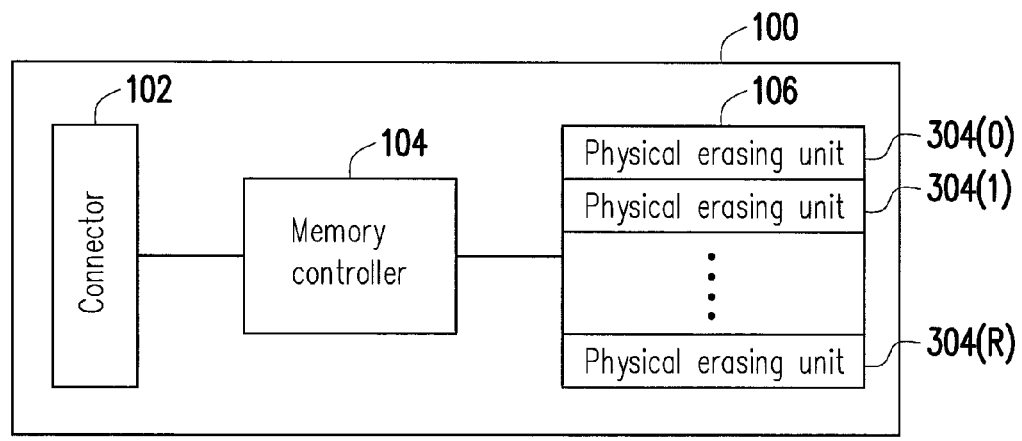
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the peripheral component interconnect (PCI) express standard, the universal serial bus (USB) standard, the small computer system interface (SCSI) standard, the integrated device electronics (IDE) standard, or any other suitable standard.

The memory controller 104 executes a plurality of logic gates or control instructions implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erasing units 304(0)-304(R). The physical erasing units 304(0)-304(R) may belong to a same memory die or different memory dies. Each physical erasing unit has a plurality of physical programming units. The physical programming units belonging to the same physical erasing unit can be individually written but have to be erased all together. Each physical erasing unit may be composed of 128 physical programming units. However, the present invention is not limited thereto, and each physical erasing unit may also be composed of 64, 256, or any other number of physical programming units.

To be specific, physical erasing unit is the smallest unit for erasing data. Namely, each physical erasing unit contains the least number of memory cells that are erased all together. Physical programming unit is the smallest unit for programming data. Namely, physical programming unit is the smallest unit for writing data. Each physical programming unit usually includes a data bit area and a redundant bit area. The data bit area includes a plurality of physical access addresses for storing user data, and the redundant bit area is used for storing system data (for example, control information and error checking and correcting codes (ECCs)). In the present exemplary embodiment, the data bit area of each physical programming unit includes 4 physical access addresses, and the capacity of each physical access address is 512 bytes (B). However, the capacity and number of the physical access addresses are not limited in the invention, and in other exemplary embodiments, a data bit area may also include 8, 16, or any other greater or smaller number of physical access addresses. The physical erasing units may be physical blocks, and the physical programming units may be physical pages or physical sectors.

In the present exemplary embodiment, the rewritable non-volatile memory module 106 is a multi level cell (MLC) NAND flash memory module (i.e., each memory cell stores a data of at least 2 bits). However, the present invention is not limited thereto, and the rewritable non-volatile memory module 106 may also be a single level cell (SLC) NAND flash memory module, a trinary level cell (TLC) NAND flash memory module, any other flash memory module, or any memory module with the same characteristics.

Figure 3:
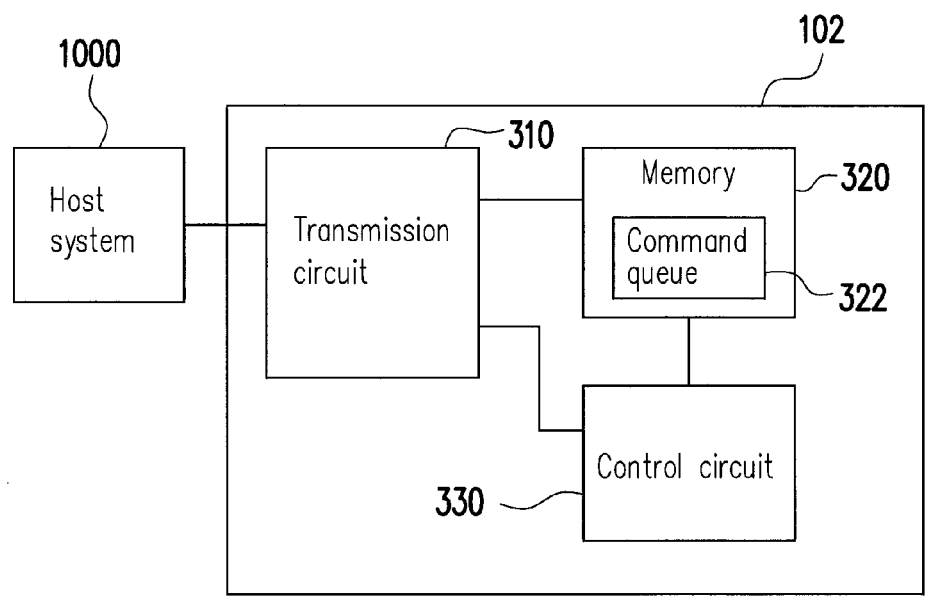
FIG. 3 is a block diagram of a connector according to an exemplary embodiment.

FIG. 3 is a block diagram of a connector according to an exemplary embodiment.

Referring to FIG. 3, the connector 102 includes a transmission circuit 310, a memory 320, and a control circuit 330.

The transmission circuit 310 receives signals from the host system 1000 and interprets the signals according to a specific standard. For example, in the SATA standard, the communication between the host system 1000 and the memory storage device 100 is carried out on a physical layer, a link layer, a transport layer, and an application layer. The transmission circuit 310 is at least in charge of the communication on the link layer and the transport layer. Namely, the transmission circuit 310 can parse or set up various primitives and frame information structures (FIS) based on the SATA standard.

The memory 320 is coupled to the transmission circuit 310 for storing commands or data from the host system 1000. In particular, commands issued by the host system 1000 are stored in a command queue 322. For example, in the SATA standard, the command queue 322 may also be referred to as a native command queueing (NCQ). Herein the memory 320 may be a RAM or a flash memory. However, the type of the memory 320 is not limited in the present invention.

The control circuit 330 is coupled to the transmission circuit 310 and the memory 320 and determines whether to execute a command in the command queue 322.

To be specific, when the connector 102 is coupled to the host system 1000, the transmission circuit 310 establishes a connection between the memory storage device 100 (i.e., the connector 102) and the host system 1000. For example, the transmission circuit 310 and the host system 1000 exchange one or a combination of a COMRESET signal, a COMINIT signal, and a COMWAKE signal conforming to out of band (OOB) signalling. Besides, the transmission circuit 310 and the host system 1000 also exchange one or more primitives (any type). Next, the host system 1000 sends one or more commands to the transmission circuit 310, and these commands are stored into the command queue 322. The memory controller 104 determines the execution sequence of the commands in the command queue 322.

When the memory controller 104 is about to execute a command, the transmission circuit 310 obtains the using right of the connection. For example, the transmission circuit 310 sends a direct memory access (DMA) setup command to the host system 1000, at this time, the using right of the connection belongs to the memory storage device 100. In addition, each command in the command queue 322 has a tag. After obtaining the using right of the connection, the transmission circuit 310 sends the tag of the command to be executed to the host system 1000. The command to be executed may be a write command, a read command, or any other command. However, the type of the command is not limited in the present invention. The host system 1000 understands which command is to be executed by the memory storage device 100 once it receives the tag. Thus, the host system 1000 sends related signals (for example, data to be written into the rewritable non-volatile memory module 106 or a memory address) to the transmission circuit 310. The memory controller 104 may write data into, read data from, or perform any other operation on the rewritable non-volatile memory module 106 according to such signals. After a command is executed, the using right of the connection belongs to the host system 1000 again.

In particular, when the using right of the connection belongs to the memory storage device 100, the host system 1000 cannot transmit any other command to the connector 102. For example, the executed command is a read command, and the control circuit 330 drives the transmission circuit 310 to transmit a plurality of data to the host system 1000. Before the data is completely transmitted, the host system 1000 cannot issue any other command to the connector 102. The commands not issued by the host system 1000 are temporarily stored in a register in the host system 1000. Besides, after a command is executed, the control circuit 330 has a higher right (compared to the host system 1000) for determining whether to execute a next command or to release the using right of the connection so that the host system 1000 can send other commands to the connector 102.

The control circuit 330 constantly detects whether the number of commands in the command queue 322 is greater than 0. If the number of commands in the command queue 322 is greater than 0, the control circuit 330 starts a command queue state machine to execute a command in the command queue 322. Next, the control circuit 330 determines whether there is enough space in the memory 320 for executing the command. If there is no enough space in the memory 320, the control circuit 330 waits until there is enough space in the memory 320. In particular, if there is enough space in the memory 320, the control circuit 330 further determines whether the number of commands (also referred to as a command number) in the command queue 322 is greater than or equal to a threshold, so as to determine whether to execute a command.

Herein it is assumed that after the transmission circuit 310 receives a command (also referred to as a first command) from the host system 1000 and stores the first command into the command queue 322, the command queue 322 stores at least one command (also referred to as second commands). If the control circuit 330 determines that the memory 320 offers enough space, the control circuit 330 further determines whether the command number of the second commands is greater than the threshold. The threshold is a positive integer greater than 1. However, the value of the threshold is not limited in the present invention. If the command number is greater than the threshold, the transmission circuit 310 obtains the using right of the connection, and the control circuit 330 executes one of the second commands. For example, the control circuit 330 controls the transmission circuit 310 to transmit the corresponding tag or corresponding FIS to the host system 1000. Contrarily, if the command number is not greater than the threshold, the control circuit 330 controls the transmission circuit 310 to wait for a command from the host system 1000, at this time, the using right of the connection belongs to the host system 1000. For example, the control circuit 330 sets the connector 102 to be in an idle state. When the using right of the connection belongs to the host system 1000, the host system 1000 can transmit other commands to the connector 102. Thereby, the number of commands in the command queue 322 remains above the threshold, so that the memory controller 104 can remain in the "busy" state as longer as possible and accordingly the system efficiency can be improved.

In an exemplary embodiment, the control circuit 330 sets a predetermined time and waits for the predetermined time to elapse when the command number is not greater than the threshold. The predetermined time is a very short period (for example, several micro seconds). However, the value of the predetermined time is not limited in the present invention. The transmission circuit 310 stores a command (also referred to as a third command) received from the host system 1000 during the predetermined time into the command queue 322. It should be noted that during the predetermined time, the transmission circuit 310 waits to receive a command from the host system 1000, and meanwhile, the memory controller 104 executes a valid command. The valid command is a command which has its related data ready and is executed to perform a corresponding operation on data stored in the memory storage device 100. For example, the host system 1000 has already transmitted data (for example, a memory address) related to a fourth command to the transmission circuit 310 (i.e., the fourth command is a valid command) before the transmission circuit 310 starts waiting. During the predetermined time, the memory controller 104 executes the fourth command (for example, writes data into or reads data from the rewritable non-volatile memory module 106, where the operation does not involve the transmission circuit 310, namely, no data is transmitted to or received from the host system 1000 through the transmission circuit 310). After the predetermined time elapses, the connector 102 obtains the using right of the connection, and the control circuit 330 executes a command in the command queue 322.

In the present exemplary embodiment, if the command number is greater than the threshold, the control circuit 330 executes the commands in the command queue 322 until the command number is not greater than the threshold. The control circuit 330 can continuously executes the commands in the command queue 322 until there is no more command in the command queue 322. Or, the control circuit 330 can wait for a predetermined time once the command number is not greater than the threshold, so as to allow the host system 1000 to transmit other commands to the transmission circuit 310. However, the present invention is not limited herein.

In the present exemplary embodiment, the command queue 322 can store 32 commands, and accordingly, the threshold is greater than 1 and smaller than 32. However, the present invention is not limited thereto, and in other exemplary embodiments, the command queue 322 can store more or fewer commands, and the threshold may be in other value ranges. In an exemplary embodiment, the threshold is in direct ratio to a channel number of the rewritable non-volatile memory module 106. To be specific, the channel number indicates the number of memory units (not shown) from which the rewritable non-volatile memory module 106 can read data at the same time, and the physical erasing units 304(0)-304(R) are distributed in these memory units. A large channel number means that the memory controller 104 can read data from or write data into (in a parallel manner) the rewritable non-volatile memory module 106 quickly. Namely, the larger the channel number is, the more quickly the memory controller 104 executes commands. Thus, the control circuit 330 sets the threshold to be in direct ratio to the channel number so that the command queue 322 can have enough number of commands to keep the memory controller 104 busy.

Figure 4:
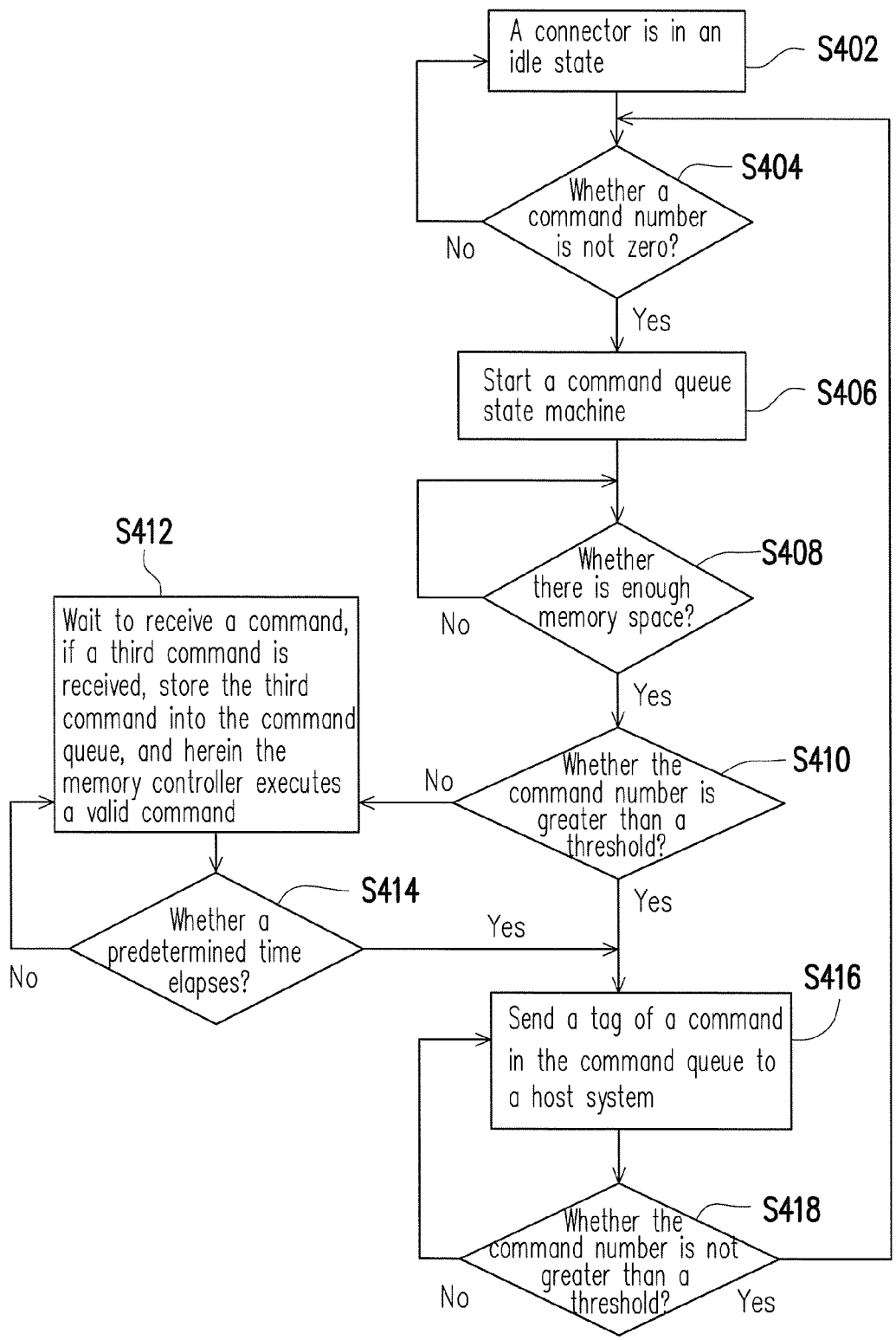
FIG. 4 is a system flowchart of a connector according to an exemplary embodiment.

FIG. 4 is a system flowchart of a connector according to an exemplary embodiment.

Referring to FIG. 4, in step S402, the connector 102 is in the idle state. In step S404, the control circuit 330 determines whether the command number is not 0. If the control circuit 330 determines in step S404 that the command number is 0, the control circuit 330 returns to step S402 to keep the connector 102 in the idle state.

If the control circuit 330 determines in step S404 that the command number is not 0, in step S406, the control circuit 330 starts a command queue state machine. In step S408, the control circuit 330 determines whether there is enough memory space. If the control circuit 330 determines in step S408 that there is no enough memory space, the control circuit 330 waits until enough memory space is obtained.

If the control circuit 330 determines in step S408 that there is enough memory space, in step S410, the control circuit 330 determines whether the command number is greater than the threshold. If the control circuit 330 determines in step S410 that the command number is not greater than the threshold, the control circuit 330 waits to receive a command (step S412) and determines whether a predetermined time has elapsed (step S414). If the transmission circuit 310 receives a third command in step S412, the transmission circuit 310 stores the third command into the command queue 322, and the memory controller 104 executes a valid command. If the control circuit 330 determines in step S410 that the command number is greater than the threshold, the control circuit 330 sends a tag of a command in the command queue to a host system (step S416) and determines whether the command number is not greater than the threshold (step S418). The control circuit 330 executes this step until the command number is not greater than the threshold. If the control circuit 330 determines in step S418 that the command number is greater than the threshold, the control circuit 330 returns to step S404.

Figure 5:
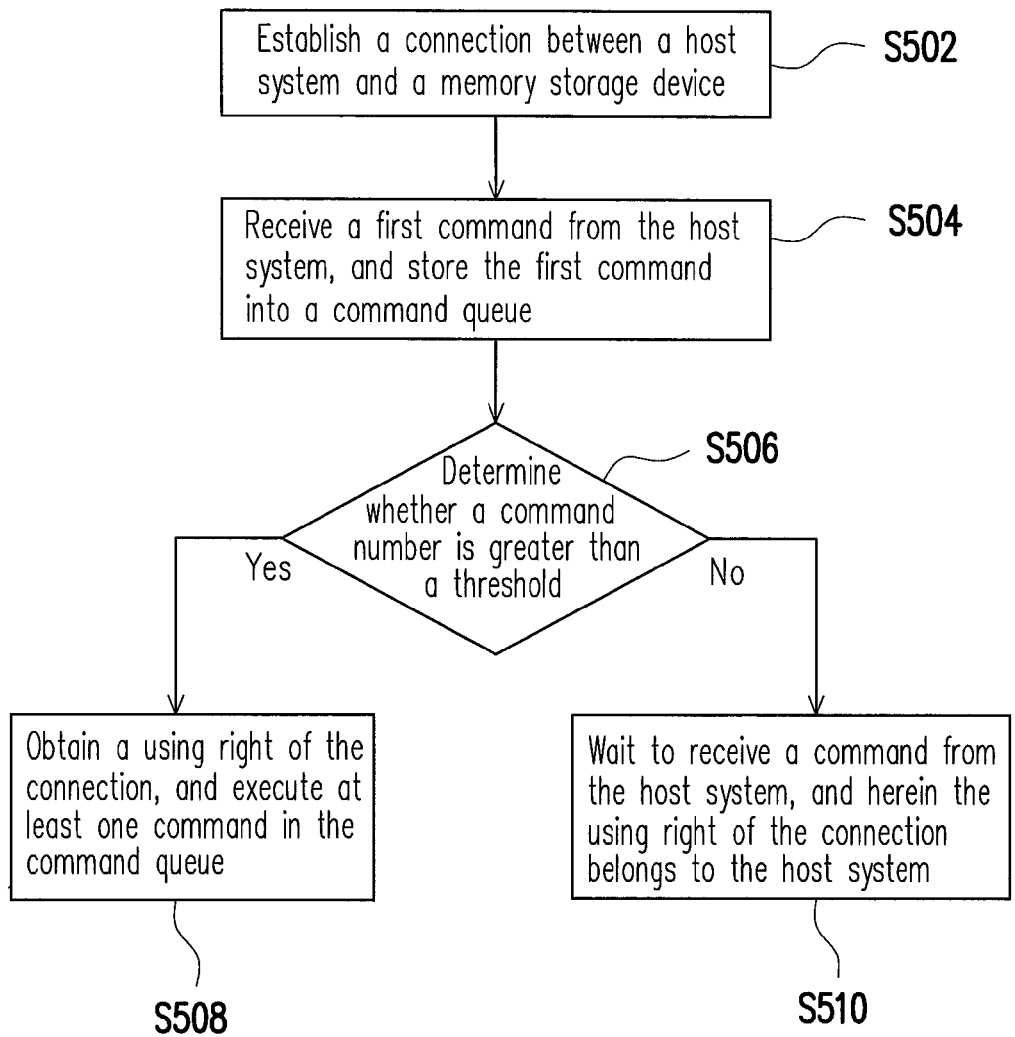
FIG. 5 is a flowchart of a controlling method according to an exemplary embodiment.

FIG. 5 is a flowchart of a controlling method according to an exemplary embodiment.

Referring to FIG. 5, in step S502, a connection between a host system and a memory storage device is established. In step S504, a first command is received from the host system and stored into a command queue. In step S506, whether the command number is greater than a threshold is determined.

If it is determined in step S506 that the command number is greater than the threshold, in step S508, a using right of the connection is obtained and at least one command in the command queue is executed by a memory controller. If it is determined in step S506 that the command number is not greater than the threshold, in step S510, a command from the host system is waited for, and herein the using right of the connection belongs to the host system. The steps in FIG. 5 have been described in detail above therefore will not be further described herein.

The steps in FIG. 5 can be implemented as one or more modules, and these modules can be stored in a memory and executed by a processor. Or, the steps in FIG. 5 can be implemented as one or more circuits (for example, the transmission circuit 310 and the control circuit 330). However, whether the steps in FIG. 5 are implemented in a software form or a hardware form is not limited in the present invention. Additionally, the flowchart in FIG. 5 can be implemented either along with the exemplary embodiments described above or independently, which is not limited in the present invention.

As described above, exemplary embodiments of the present invention provide a memory storage device, a connector, and a controlling method, in which a host system is allowed to issue commands to the memory storage device when the number of commands in a command queue is not greater than a threshold, so that the execution efficiency of the entire system is improved.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controlling method for a memory storage device, the controlling method comprising:
   establishing a connection between a host system and the memory storage device;
   receiving a first command from the host system and storing the first command into a command queue, wherein the command queue comprises at least one second command after the first command is stored into the command queue;
   determining whether a command number of the at least one second command is greater than a threshold, wherein the threshold is greater than 1;
   wherein when the command number is greater than the threshold, receiving one of the at least one second command from the command queue, obtaining a using right of the connection and executing one of the at least one second command by the memory storage device, wherein the step of executing one of the at least one second command comprises transmitting a tag of the one of the at least one second command from the memory storage to the host system, wherein the host system transmits a memory address corresponding to the one of the at least one second command to the storage device based on the tag of the one of the at least one second command; and
   wherein when the command number is not greater than the threshold, waiting to receive a command from the host system and the using right of the connection belongs to the host system,
   wherein when the using right of the connection belongs to the memory storage device, the memory storage device executes one of the at least one second command and the host system does not transmit one of the at least one second command to the memory storage device;
   wherein when the using right of the connection belongs to the host system, the memory storage device does not execute the received at least one second command and the host system transmit one of the at least one second command to the memory storage device.

2. The controlling method according to claim 1, wherein the step of executing one of the at least one second command comprises:
   executing one of the at least one second command until the command number is not greater than the threshold.

3. The controlling method according to claim 1, wherein the step of waiting to receive a command from the host system comprises:
   waiting for a predetermined time; and
   after the predetermined time elapses, obtaining the using right of the connection and executing one of the at least one second command by the memory storage device.

4. The controlling method according to claim 3, wherein the memory storage device comprises a memory controller, and the step of waiting for the predetermined time further comprises:
   during the predetermined time, executing a valid command by the memory controller to perform a corresponding operation on data stored in the memory storage device.

5. The controlling method according to claim 3, further comprising:
   when a third command is received from the host system during the predetermined time, storing the third command into the command queue.

6. The controlling method according to claim 1, wherein the memory storage device comprises a rewritable non-volatile memory module, and the threshold is in direct ratio to a channel number of the rewritable non-volatile memory module.

7. A connector, comprising:
   a memory, configured to store a command queue;
   a transmission circuit, coupled to the memory, configured to establish a connection between a host system and the connector, receive a first command from the host system, and store the first command into the command queue, wherein the command queue comprises at least one second command after the first command is stored into the command queue; and
   a control circuit, coupled to the memory and the transmission circuit, configured to determine whether a command number of the at least one second command is greater than a threshold, wherein the threshold is greater than 1,
   wherein when the command number is greater than the threshold, the transmission circuit is configured to receive one of the at least one second command from the command queue and to obtain a using right of the connection, and the control circuit is configured to execute one of the at least one second command, wherein the operation that the control circuit executes one of the at least one second command comprises: the control circuit controls the transmission circuit to transmit a tag of the one of the at least one second command from the memory storage to the host system, wherein the host system transmits a memory address corresponding to the one of the at least one second command to the transmission circuit based on the tag of the one of the at least one second command,
   wherein when the command number is not greater than the threshold, the transmission circuit is configured to wait to receive a command from the host system, and the using right of the connection belongs to the host system,
   wherein when the using right of the connection belongs to the transmission circuit, the control circuit executes one of the at least one second command and the host system does not transmit one of the at least one second command to the transmission circuit; wherein when the using right of the connection belongs to the host system, the control circuit does not execute the received at least one second command and the host system transmit one of the at least one second command to the transmission circuit.

8. The connector according to claim 7, wherein the operation that the control circuit executes one of the at least one second command comprises:
the control circuit executes one of the at least one second command until the command number is not greater than the threshold.

9. The connector according to claim 7, wherein the operation that the transmission circuit waits to receive a command from the host system comprises:
the transmission circuit waits for a predetermined time; and
after the predetermined time elapses, the transmission circuit obtains the using right of the connection, and the control circuit executes one of the second command.

10. The connector according to claim 9, wherein the connector is configured to couple to a memory controller, and the memory controller is configured to execute a valid command during the predetermined time to perform a corresponding operation on data stored in the memory.

11. The connector according to claim 9, wherein the transmission circuit is further configured to receive a third command from the host system during the predetermined time and store the third command into the command queue.

12. The connector according to claim 10, wherein the memory controller is configured to couple to a rewritable non-volatile memory module, and the threshold is in direct ratio to a channel number of the rewritable non-volatile memory module.

13. A memory storage device, comprising:
a connector, configured to couple to a host system;
a rewritable non-volatile memory module, comprising a plurality of physical erasing units; and
a memory controller, coupled to the connector and the rewritable non-volatile memory module,
wherein the connector comprises:
a memory, configured to store a command queue;
a transmission circuit, coupled to the memory, configured to establish a connection between the host system and the memory storage device, receive a first command from the host system, and store the first command into the command queue, wherein the command queue comprises at least one second command after the first command is stored into the command queue; and
a control circuit, coupled to the memory and the transmission circuit, configured to determine whether a command number of the at least one second command is greater than a threshold, wherein the threshold is greater than 1,
wherein when the command number is greater than the threshold, the transmission circuit is configured to receive one of the at least one second command from the command queue and to obtain a using right of the connection, and the control circuit executes one of the at least one second command, wherein the operation that the control circuit executes one of the at least one second command comprises: the control circuit controls the transmission circuit to transmit a tag of the one of the at least one second command from the memory storage device to the host system, wherein the host system transmits a memory address corresponding to the one of the at least one second command to the memory storage device based on the tag of the one of the at least one second command,
wherein when the command number is not greater than the threshold, the transmission circuit is configured to wait to receive a command from the host system and the using right of the connection belongs to the host system,
wherein when the using right of the connection belongs to the transmission circuit, the control circuit executes one of the at least one second command and the host system does not transmit one of the at least one second command to the transmission circuit; wherein when the using right of the connection belongs to the host system, the control circuit does not execute the received at least one second command and the host system transmit one of the at least one second command to the transmission circuit.

14. The memory storage device according to claim 13, wherein the operation that the control circuit executes one of the at least one second command comprises:
the control circuit executes one of the at least one second command until the command number is not greater than the threshold.

15. The memory storage device according to claim 13, wherein the operation that the transmission circuit waits to receive a command from the host system comprises:
the transmission circuit waits for a predetermined time; and
after the predetermined time elapses, the transmission circuit obtains the using right of the connection, and the control circuit executes one of the at least one second command.

16. The memory storage device according to claim 15, wherein the memory controller is configured to execute a valid command during the predetermined time to perform a corresponding operation on data stored in the memory storage device.

17. The memory storage device according to claim 15, wherein the transmission circuit is further configured to receive a third command from the host system during the predetermined time and store the third command into the command queue.

18. The memory storage device according to claim 13, wherein the threshold is in direct ratio to a channel number of the rewritable non-volatile memory module.

* * * * *